(12) United States Patent
Harris et al.

(10) Patent No.: US 8,700,435 B2
(45) Date of Patent: Apr. 15, 2014

(54) SYSTEM AND METHOD FOR REDEMPTION AND EXCHANGE OF UNUSED TICKETS

(75) Inventors: Traci L. Harris, Peoria, AZ (US); Diego Espinosa, Phoenix, AZ (US); Tovah L. Licht, Scottsdale, AZ (US); Wade Chism, Surprise, AZ (US); Krista S. Freiland, Phoenix, AZ (US); Robert B. Cross, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 615 days.

(21) Appl. No.: 11/617,930

(22) Filed: Dec. 29, 2006

(65) Prior Publication Data

US 2008/0162197 A1   Jul. 3, 2008

(51) Int. Cl.
*G06Q 10/00* (2012.01)
*G06Q 30/00* (2012.01)

(52) U.S. Cl.
USPC .............................. 705/5; 705/1.1; 705/7.35

(58) Field of Classification Search
USPC .................. 705/1.1, 5–6, 7.11–7.42, 400
See application file for complete search history.

(56) References Cited

U.S. PATENT DOCUMENTS

| | | |
|---|---|---|
| 4,720,785 A | 1/1988 | Shapiro |
| 4,896,791 A | 1/1990 | Smith |
| 5,023,782 A | 6/1991 | Lutz et al. |
| 5,237,499 A | 8/1993 | Garbeck |
| 5,253,166 A | 10/1993 | Dettelbach et al. |
| 5,404,291 A | 4/1995 | Kerr et al. |
| 5,467,269 A | 11/1995 | Flaten |
| 5,483,444 A | 1/1996 | Heintzeman et al. |
| 5,513,102 A | 4/1996 | Auriemma |
| 5,621,797 A | 4/1997 | Rosen |
| 5,648,900 A | 7/1997 | Bowen et al. |
| 5,724,520 A | 3/1998 | Goheen |
| 5,754,654 A | 5/1998 | Hiroya et al. |
| 5,781,892 A | 7/1998 | Hunt et al. |
| 5,797,127 A | 8/1998 | Walker et al. |
| 5,832,451 A | 11/1998 | Flake et al. |
| 5,855,006 A | 12/1998 | Huemoeller et al. |
| 5,878,139 A | 3/1999 | Rosen |

(Continued)

FOREIGN PATENT DOCUMENTS

| | | |
|---|---|---|
| CN | 1182242 | 5/1998 |
| CN | 1182243 | 5/1998 |

(Continued)

OTHER PUBLICATIONS

U.S. Appl. No. 09/346,085, Office Action dated May 24, 2001.

(Continued)

*Primary Examiner* — George Chen
(74) *Attorney, Agent, or Firm* — Snell & Wilmer L.L.P.

(57) ABSTRACT

A method of facilitating and performing the redemption and exchange of unused tickets includes steps of determining the availability of unused tickets, calculating a redemption value of an available unused ticket, and updating a status of the unused ticket. The availability is determined by querying a database containing information pertaining to unused tickets. The redemption value is calculated based on the application of validation rules. The status is updated after a decision as to whether to redeem the unused ticket has been made. The redemption value is obtainable by exchanging the unused ticket for a new ticket. The tickets may be for air travel.

23 Claims, 3 Drawing Sheets

(56) References Cited

U.S. PATENT DOCUMENTS

| | | | |
|---|---|---|---|
| 6,009,401 A | 12/1999 | Horstmann | |
| 6,085,169 A | 7/2000 | Walker et al. | |
| 6,086,477 A | 7/2000 | Walker et al. | |
| 6,094,640 A | 7/2000 | Goheen | |
| 6,101,477 A | 8/2000 | Hohle et al. | |
| 6,107,932 A * | 8/2000 | Walker et al. | 340/5.22 |
| 6,134,534 A | 10/2000 | Walker et al. | |
| 6,175,922 B1 | 1/2001 | Wang | |
| 6,241,606 B1 | 6/2001 | Riendeau et al. | |
| 6,307,572 B1 | 10/2001 | DeMarcken et al. | |
| 6,308,159 B1 | 10/2001 | Strohl | |
| 6,336,095 B1 | 1/2002 | Rosen | |
| 6,338,041 B1 | 1/2002 | Kawamata | |
| 6,442,526 B1 | 8/2002 | Vance et al. | |
| 6,599,186 B1 | 7/2003 | Walker et al. | |
| 6,601,046 B1 | 7/2003 | Epstein | |
| 6,658,390 B1 | 12/2003 | Walker et al. | |
| 7,050,986 B1 | 5/2006 | Vance et al. | |
| 7,194,417 B1 | 3/2007 | Jones | |
| 7,711,586 B2 * | 5/2010 | Aggarwal et al. | 705/5 |
| 2001/0016825 A1 | 8/2001 | Pugliese, III et al. | |
| 2002/0007327 A1 | 1/2002 | Steury et al. | |
| 2002/0016723 A1 * | 2/2002 | Matsui et al. | 705/6 |
| 2002/0019807 A1 | 2/2002 | Halpern | |
| 2002/0023017 A1 | 2/2002 | Hidaka et al. | |
| 2002/0026405 A1 | 2/2002 | Haar | |
| 2002/0026416 A1 * | 2/2002 | Provinse | 705/39 |
| 2002/0049658 A1 | 4/2002 | Davidson et al. | |
| 2002/0069118 A1 | 6/2002 | Zylstra | |
| 2002/0103849 A1 | 8/2002 | Smith | |
| 2002/0138325 A1 | 9/2002 | Mashimo et al. | |
| 2002/0139843 A1 | 10/2002 | Park et al. | |
| 2002/0156715 A1 | 10/2002 | Wall et al. | |
| 2002/0178034 A1 | 11/2002 | Gardner et al. | |
| 2003/0126033 A1 | 7/2003 | Evans et al. | |
| 2003/0154387 A1 | 8/2003 | Evans et al. | |
| 2003/0177022 A1 | 9/2003 | Francis | |
| 2003/0216973 A1 | 11/2003 | Walker et al. | |
| 2004/0006497 A1 | 1/2004 | Nestor et al. | |
| 2004/0010427 A1 * | 1/2004 | Barnes et al. | 705/5 |
| 2004/0039658 A1 * | 2/2004 | Hume et al. | 705/26 |
| 2004/0088204 A1 | 5/2004 | Plum et al. | |
| 2004/0138930 A1 * | 7/2004 | Barnes et al. | 705/5 |
| 2005/0256750 A1 * | 11/2005 | Hand et al. | 705/5 |
| 2006/0184399 A1 | 8/2006 | Goldstein | |
| 2006/0184422 A1 | 8/2006 | Cooper et al. | |
| 2006/0190315 A1 * | 8/2006 | Aggarwal et al. | 705/9 |
| 2008/0010101 A1 * | 1/2008 | Williamson et al. | 705/5 |
| 2008/0041945 A1 * | 2/2008 | Williamson et al. | 235/384 |
| 2008/0077453 A1 | 3/2008 | Pedron et al. | |

FOREIGN PATENT DOCUMENTS

| | | |
|---|---|---|
| EP | 0762306 | 3/1997 |
| WO | WO/96/07266 | 3/1996 |
| WO | 9810361 | 3/1998 |
| WO | WO/01/02980 | 1/2001 |

OTHER PUBLICATIONS

U.S. Appl. No. 09/346,085, Final Office Action dated Oct. 22, 2001.
U.S. Appl. No. 09/346,085, Advisory Action dated Jan. 9, 2002.
U.S. Appl. No. 09/346,085, Office Action dated Feb. 12, 2003.
U.S. Appl. No. 09/346,085, Final Office Action dated Jul. 23, 2003.
U.S. Appl. No. 09/346,085, Advisory Action dated Sep. 11, 2003.
U.S. Appl. No. 09/346,085, Office Action dated Oct. 20, 2003.
U.S. Appl. No. 09/346,085, Final Office Action Action dated Apr. 7, 2004.
U.S. Appl. No. 09/346,085, Advisory Action dated May 24, 2004.
U.S. Appl. No. 09/346,085, Office Action dated Jul. 14, 2004.
U.S. Appl. No. 09/346,085, Final Office Action dated Jun. 2, 2005.
U.S. Appl. No. 09/346,085, Advisory Action dated Aug. 12, 2005.
U.S. Appl. No. 09/346,085, Office Action dated Apr. 18, 2006.
U.S. Appl. No. 09/346,085, Notice of Allowance dated Apr. 18, 2007.
U.S. Appl. No. 10/294,930, Office Action dated Jun. 30, 2006.
U.S. Appl. No. 10/294,930, Final Office Action dated Apr. 17, 2007.
U.S. Appl. No. 10/294,930, Advisory Action dated Oct. 17, 2007.
U.S. Appl. No. 10/294,930, Office Action dated Dec. 3, 2007.
U.S. Appl. No. 10/294,930, Office Action dated Sep. 15, 2008.
U.S. Appl. No. 10/294,930, Notice of Allowance dated Mar. 12, 2009.
U.S. Appl. No. 10/708,112, Office Action dated Oct. 5, 2006.
U.S. Appl. No. 10/708,112, Final Office Action dated Apr. 9, 2007.
U.S. Appl. No. 10/708,112, Advisory Action dated Aug. 24, 2007.
U.S. Appl. No. 10/708,112, Office Action dated Nov. 13, 2007.
U.S. Appl. No. 10/708,112, Office Action dated Dec. 26, 2008.
U.S. Appl. No. 10/708,112, Notice of Allowance dated Mar. 12, 2009.
U.S. Appl. No. 11/617,930, Office Action dated Mar. 4, 2009.
U.S. Appl. No. 11/617,930, Final Office Action dated Jan. 5, 2010.
U.S. Appl. No. 11/617,922, Office Action dated Jun. 9, 2009.
U.S. Appl. No. 11/617,922, Final Office Action dated Jan. 11, 2010.
M2 Presswire; American Express Ticket TRAX service launches for American Express Business Travel Clients, dated Mar. 12, 1999.
Melissa Abernathy; American Express Expands RoundTrip Services with Array of New Products and Service, dated Jul. 15, 1997; Business Wire.
T&E Managers' Forum; Managing T&E, Oct. 1999.
Future Mix of Western Fuels Leans to Gas; Megawatt Daily; dated Sep. 25, 1998.
American Express Expands Automated Tracking and Refunding of Unused Electronic Air Tickets Globally; American Express News Release; dated Aug. 11, 2003.
Sharkey, Joe; On The Road; A Business Changed, Perhaps Permanently; The New York Times; dated Jul. 16, 2002.
A Smarter Way to Fly; published in eCompany Now, May 2000.
Forgotten Tickets, Railroad Policy Survives; published in New York Times Dec. 19, 1997.
Why do I have to Wait a Year to Get a Refund on My Airline Tickets?; published in Money Magazine, May 1997.
Joseph Kornik; Firm's New System Tracks, Refunds Unused E-Tickets; Travel Weekly May 24, 1999; p. 24.
U.S. Appl. No. 11/617,922, Advisory Action dated Mar. 17, 2010.
USPTO, Office Action in U.S. Appl. No. 11/161,467 dated Oct. 14, 2009.
USPTO, Final Office Action in U.S. Appl. No. 11/161,467 dated Feb. 8, 2010.
USPTO, Advisory Action in U.S. Appl. No. 11/161,467 dated Mar. 30, 2010.
PCT; International Preliminary Examination Report dated May 15, 2001 in Application No. PCT/US2000/012651.
PCT; International Search Report and Written Opinion dated Jun. 30, 2008 in Application No. PCT/US2007/025729.
PCT; International Preliminary Report on Patentability dated Jul. 9, 2009 in Application No. PCT/US2007/025729.
AU; Examiner's First Report dated Mar. 6, 2003 in Application No. 48318/00.
EP; Examination Report dated Apr. 28, 2003 in Application No. 00930508.7.
NZ; Examination Report dated Mar. 11, 2003 in Application No. 516724.
PCT; International Search Report and date Apr. 3, 2003 in Application No. PCT/US2002/039175.
PCT; International Search Report and Written Opinion dated May 12, 2008 in Application No. PCT/US2007/026133.
PCT; International Preliminary Report on Patentability dated Jul. 9, 2009 in Application No. PCT/US2007/026133.
CA; Examination Report dated Feb. 19, 2009 in Application No. 2374618.
CA; Examination Report dated Dec. 18, 2006 in Application No. 2374618.
CA; Examination Report dated Aug. 2, 2005 in Application No. 2374618.
CA; Examination Report dated Oct. 6, 2004 in Application No. 2374618.
CA; Examination Report dated Feb. 19, 2003 in Application No. 2374618.
PR Newswire, "American Express Finds and Refunds More Than $2.5 Million in "Lost" Electronic Tickets with New Service for

(56) References Cited

OTHER PUBLICATIONS

Corporations," New York Mar. 10, 1999, Retrieved from: http://www.thefreelibrary.com/American+Express+Finds+and+Refunds+More+than+$2.5+Million+in+'lost' . . . -a054067288.

USPTO; Office Action dated Feb. 15, 2011 in U.S. Appl. No. 11/617,922.
USPTO; Advisory Action dated Oct. 21, 2011 in U.S. Appl. No. 11/617,922.
USPTO; Final Office Action dated Aug. 5, 2011 in U.S. Appl. No. 11/617,922.

* cited by examiner

SYSTEM AND METHOD FOR REDEMPTION AND EXCHANGE OF UNUSED TICKETS

BACKGROUND OF THE INVENTION

1. Field of the Invention

The present invention generally relates to methods of redemption and exchange of unused tickets, and in particular to methods of redemption and exchange of unused airline tickets. The present invention also relates to systems and apparatuses corresponding to such methods.

2. Related Art

The number of tickets being issued for services (such as airline and other forms of travel as well as hotel accommodations, concerts, seminars, shows, park admissions, events and the like) is rapidly increasing. In particular, the number of electronic tickets, and specifically electronic tickets for airline travel, is increasing very rapidly. Many travelers, and especially frequent business travelers, find themselves in the position of scheduling many trips, changing itineraries, canceling or rescheduling trips, and otherwise creating a complex history of travel scheduling and rescheduling. It is not unusual in the midst of such hectic travel history for a traveler to forget about or lose track of unused tickets. The problem of failure to timely use tickets and/or to redeem unused tickets is exacerbated by the growing use of electronic tickets, since, in the case of an electronic ticket, the traveler may have no paper record to remind him or her when to use the ticket or even that a ticket exists.

Generally, unused tickets expire after a prescribed period of time. If no refund is claimed after expiration, the residual value of the unused ticket is usually kept by the airline or other service provider, resulting in a total loss for the purchaser. A frequent traveler or a business that employs a number of employees who travel can sustain significant financial losses by allowing multiple paid-in-full, but unused tickets to expire rather than obtaining refunds for them.

At least some of this financial loss may be avoided by keeping track of unused tickets and seeking refunds therefor in a timely manner. For example, full or partial refunds may be available prior to a specific date, although they may be severely limited after such date. Even if the tickets are specified as not being refundable, it is often the case that they be redeemable for some form of value. In such cases, the financial loss may be avoided or mitigated by redemption of the unused tickets. This latter situation is becoming increasingly important because the use of non-refundable tickets is growing, due in large part to the significant cost savings associated therewith.

Unfortunately, to recapture value from an unused, non-refundable ticket usually requires a cumbersome alternative to a refund, such as an exchange, a credit, a discount, or some other mechanism for redeeming the ticket to capture its residual value. For example, it may be the case that an unused, non-refundable ticket is redeemable as credit toward the purchase of a new ticket. That is, the residual value of the unused, non-refundable ticket may be applied as full or partial payment for the new ticket. However, to effect such redemption of the unused, non-refundable ticket, it is necessary for the booking agency to collect information pertaining to both the unused, non-refundable ticket and the new ticket and to apply so-called validation rules that govern redemption/exchange of the unused, non-refundable ticket. The validation rules are based on characteristics of the tickets and typically limit the conditions under which the unused, non-refundable ticket can be redeemed/exchanged. For example, the validation rules may require that the unused, non-refundable ticket be exchanged only for travel during limited time periods, or to/from certain departure/arrival cities, etc. The validation rules also determine the amount of residual value of the unused ticket, i.e., the value for which it can be redeemed/exchanged. For example, in the case of a ticket having multiple segments (i.e., legs) of a journey, which ticket is partly unused (i.e., some, but not all legs have not been used), the validation rules may stipulate that the residual value of a ticket decreases by a given amount for each segment that has already been used.

Application of the validation rules is a time-consuming procedure. For example, it may take a travel agent 15 minutes to apply the rules to a given exchange requested by a holder of an unused, non-refundable ticket. Moreover, it is generally not feasible to estimate the residual value of an unused, non-refundable ticket, or even to determine whether it is exchangeable at all, by some other means that would permit one to bypass application of the rules. This is because the rules are not typically indicated on the paper ticket at all, or in other travel records in straightforward plain language. In addition, the rules are often complicated, and in some cases, debatable. Thus, it is necessary to perform the laborious and time-consuming procedure of applying the rules even though there is a significant chance of obtaining a negative outcome, e.g., of determining that the ticket may not be used as desired or has no significant value at all. For example, upon application of the rules, it could turn out that the ticket may not be exchanged for the requested new ticket, but could be exchanged for certain other new tickets, or that the ticket has insignificant residual value, or may not be exchanged for any new ticket. The ticket that the customer believes is unused may be partially used (i.e., open), which the travel agent may not be able to ascertain without going through the process of applying the validation rules.

Since travel agents are generally under pressure or requirements to limit the time allocated to a given customer or transaction, they may not have an incentive to apply the validation rules, in view of the time and difficulty involved therewith and the possibility that the time and labor expended could turn out to be wasted. Accordingly, it is often the case that no attempt is even made to redeem/exchange an unused ticket. Consequently, many unused tickets expire without their residual value having ever been sought or claimed. This practice causes significant financial loss to travelers and, in particular, to large organizations having many employees who travel.

In addition to the above-described problems of time and labor and consequent disincentive to attempt redemption of unused tickets, the difficulty of applying the validation rules results in errors being made by travel agents in processing exchanges of unused tickets for new tickets. For example, the travel agent could mistakenly charge a traveler too low a price for such an exchange. When such an error is discovered by the ticket issuer, the ticket issuer issues a debit memo to the travel agency. The travel agency has to pay the ticket issuer (1) the difference between the correct price and the price it collected from the customer and paid the ticket issuer and (2) a penalty for making the mistake. These costs to the travel agency constitute another disincentive to attempting to obtain the residual value from unused tickets.

In addition to facing the above-described problems involved in processing redemption/exchanges of unused tickets, large organizations (e.g., travel agencies) have had difficulty effectively recapturing the residual value of unused tickets due to the lack of both (1) a centralized database for keeping records of unused tickets, accessible by all the offices or branches of an agency, and (2) a single uniform procedure for processing and redeeming unused tickets, which is followed by the offices or branches of an agency. Thus, different local offices may each operate according to their own local procedures, with no attempt to ensure that the most efficient procedure is used by all. Also, offices may not even have the ability to retrieve the information about existing unused tickets issued by other offices of the same agency, which information would be necessary to use such tickets in exchange for a new ticket (e.g., if a traveler purchases a ticket at one office, does not use it, and wishes to redeem/exchange it for a new ticket at a different office of the agency).

In sum, conventionally, there has been no effective and efficient way to track unused tickets and to facilitate their redemption/exchange for credit applied to the purchase of new tickets on behalf of the traveler/purchaser. Any systems that have been available have been substantially manual systems that are not sufficiently reliable in terms of tracking unused tickets, identifying the status of such tickets (e.g., as unused or redeemed/exchanged), providing this information to the traveler/purchaser for the purpose of redemption/exchange, and efficiently processing redemptions/exchanges of unused tickets. In addition, existing systems have not been organized on an organizationally global scale.

Accordingly, the need exists for an improved (e.g., more organized and more automated) system for the redemption/exchange of unused tickets, including the various support mechanisms/infrastructure for such a system as described above, such as would overcome or mitigate the problems described above.

SUMMARY OF THE INVENTION

The present invention provides a system, method and computer program product for the redemption/exchange of unused tickets that meets the above-identified needs.

According to a first aspect of the present invention, a method of facilitating exchange of unused tickets includes the steps of receiving an electronic request to retrieve an electronic account record of a client from at least one database, retrieving the client account record from the at least one database based on the electronic request, wherein in connection with the retrieval, it is determined whether the at least one database has a ticket record of an unused ticket for the client, and providing an alert of existence of the unused ticket, if it is determined in the retrieving step that the at least one database has the ticket record.

According to a second aspect of the present invention, in the method according to the first aspect the alert is a display of details of the unused ticket.

According to a third aspect of the present invention, in the method according to the second aspect the details of the unused ticket include at least one of the expiration date of the unused ticket, the issuing source of the unused ticket, and the airline of the unused ticket.

According to a fourth aspect of the present invention, in the method according to the second aspect the details of the unused ticket include the redemption value of the unused ticket.

According to a fifth aspect of the present invention, in the method according to the second aspect the alert is provided to at least one of a ticket booking agent and the client.

According to other aspects of the present invention, there are provided systems and computer program products corresponding to the above-described methods.

The present invention represents an improvement over the prior art and facilitates the redemption and exchange of unused tickets by eliminating to a great degree the difficulty and time involved in the activity of applying the validation rules. In addition, the invention eliminates to a great degree the possibility of errors being made in applying the validation rules; if errors are nonetheless made, the adverse financial consequences associated therewith are largely eliminated. In these ways, existing disincentives to seeking redemption of unused tickets are largely eliminated. In addition, the invention employs a centralized database and procedure, not only streamlining the redemption/exchange process as a whole but also in particular facilitating access to information about unused tickets so as to largely eliminate the possibility that unused tickets are not redeemed due to a lack of knowledge thereof or to inability to access information pertaining thereto.

Further features and advantages of the present invention as well as the structure and operation of various embodiments of the present invention are described in detail below with reference to the accompanying drawings. By these means, the present invention may increase the rate of redemption of unused tickets and, as a result, generate significant cost savings.

BRIEF DESCRIPTION OF THE DRAWINGS

The features and advantages of the present invention will become more apparent from the detailed description set forth below when taken in conjunction with the drawings.

DETAILED DESCRIPTION OF THE INVENTION

Figure 1:
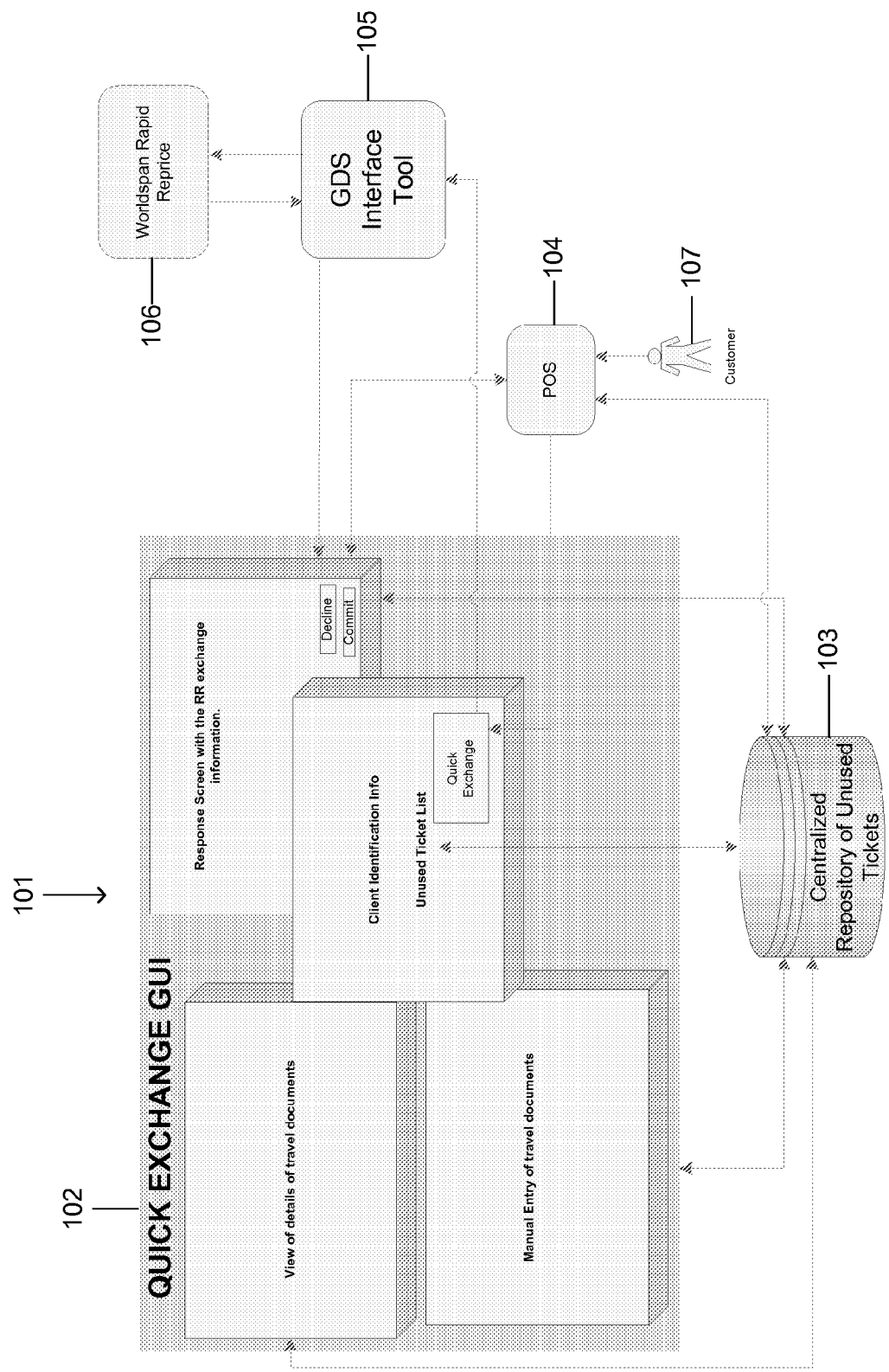
FIG. 1 is a schematic diagram illustrating a system for performing and facilitating the redemption/exchange of unused tickets.

The present invention is directed to a system, method and computer program product for performing and facilitating the redemption/exchange of unused tickets. The present invention is now described in more detail herein in terms of the above exemplary description. This is for convenience only and is not intended to limit the application of the present invention. In fact, after reading the following description, it will be apparent to one skilled in the relevant arts how to implement the following invention in alternative embodiments.

The features and advantages of the present invention will become more apparent from the detailed description set forth below when taken in conjunction with the figures.

Although the invention may be applied to the redemption/exchange of unused tickets (including vouchers, coupons and the like) of any type, one intended application of the invention is to the redemption/exchange of unused airline tickets. In what follows, an example of this application of the invention will be explained with reference to the figures. Further, the invention is illustrated with reference to services provided by a travel agency to a plurality of its clients. The clients can be individual travelers or businesses having employees who travel. The invention, however, is not limited to such a travel agency or such a client.

Although in no way limited to such application, the present invention is intended to be of particular utility to an organizational entity, e.g., a large travel agency serving a large number of clients, including large clients having a number of employees who travel.

The system may be configured as a data processing system, and may include a host server or other computing systems including a processor for processing digital data, one or more memories coupled to the processor for storing digital data, and means, coupled to the one or more memories, for inputting digital data, an application program (which may be referred to herein as Quick Exchange) stored in a memory and accessible by the processor for directing processing of digital data by the processor, a display coupled to the processor and memories for displaying information derived from digital data processed by the processor and a plurality of databases, that may include client data, ticket data, event data and/or like data that could be used in association with the present invention. As those skilled in the art will appreciate, each computer will typically include an operating system (e.g., Windows NT, 95/98/2000, Linux, Solaris, etc.) as well as various conventional support software and drivers typically associated with computers. The computers can be in a home or business environment with access to a network. In an exemplary embodiment, access may be had through the Internet through a commercially available web-browser software package.

Each participant in the system may be equipped with a computing system to facilitate online commerce transactions. The client may have a computing unit in the form of a personal computer, although other types of computing units may be used including laptops, notebooks, hand held computers, set-top boxes, and the like. The point of sale office may have a computing unit implemented in the form of a computer-server, although other implementations are possible. The central reservation center may have a computing center in the form of a mainframe computer. However, the central reservation center may be implemented in other forms, such as a mini-computer, a PC server, a network set of computers, and the like.

Communication between the parties to a ticket redemption/exchange transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computers of the involved various parties, such as travel agencies, financial institutions, and service providers, may be interconnected via a network such as an existing proprietary network accommodating electronic transactions. Such a network may be a closed network that is assumed to be secure from eavesdroppers, or a public network that may be assumed to be insecure and open to eavesdroppers, e.g., the Internet. Specific information related to the protocols, standards, and application software utilized in connection with the Internet is understood to be known to those of skill in the pertinent arts and is accordingly omitted herein.

The system of the invention, subsystems thereof, and systems interacting therewith may be suitably connected via data links. A variety of conventional communications media and protocols may be used for data links, such as a connection to an Internet Service Provider (ISP) over a local loop as is typically used in connection with standard modem communication, cable modem, Dish networks, ISDN, Digital Subscriber Line (DSL), or various wireless communication methods. Client systems might also reside within a local area network (LAN) that interfaces to a network via a leased line (T1, D3, etc.). As such communication methods are well known in the art, description thereof is omitted herein.

The system of the invention and its functional elements and interacting systems may be implemented and distributed among the various involved parties. For example, the systems may be implemented as computer software modules loaded onto the various computer systems of some of the parties so that the computers of the other parties do not require any additional software to participate in the redemption/exchange transactions and other activities supported by the system of the invention.

The system may include or interact with a number of databases, e.g., a database that includes all travel related activities scheduled and ticketed by the travel agency, a database including a listing of all clients that may participate in the redemption/exchange system, a flight database holding information on particular flights, including the flight number, cost of the ticket, departure city and arrival city, departure date, and any information on whether and to what extent the ticket is redeemable, and one or more central reservation system (CRS) databases. Of course, the system is not limited to these databases.

There are several central reservation systems, also known as computerized reservation systems or global distribution systems (GDS). (The terms "CRS" and "GDS" are used interchangeably herein.) These are databases maintained by the airline industry or other groups and are accessible by travel agents. These databases each contain information on all tickets issued from that particular GDS. Whenever a ticket is issued for any flight, that information is stored in the central reservation system database. Typically, a travel agent must access these outside databases to view ticket information. In some cases, the GDS deletes records, usually within seven days, following the date the ticket is used, or when the ticket passes an expiration date. Without having the relevant information in an agency-accessible database, if no record for a particular ticket was found in the GDS database, it would not be possible to determine whether that ticket had been used or whether it had passed its expiration date.

The expiration date for a ticket may be, e.g., a period of one year after the date of invoice. An unused ticket can generally be redeemed only prior to the expiration date.

Thus, in the present invention, it is preferable to have one or more booking agency databases that has information concerning the unused tickets. As one skilled in the art will realize, two or more databases can be combined as a single database including all of the information contained in the two separate databases, although this may not always be practical, e.g., where multiple databases are held by different corporate entities, etc.

The databases discussed herein may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. The databases may be organized in any suitable manner, including as data tables or lookup tables. Association of certain data may be accomplished through any data association technique known and practiced in the art.

A computer of the system of the invention may provide a suitable website or other Internet-based graphical user interface which is accessible by users. The term "website" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The system of the invention may employ a centralized computer that has access to all of the relevant databases to carry out all the steps of the method according to the invention. Alternatively, the functions carried out by such a computer may be carried out by a plurality of local computers, preferably localized computers that are linked together.

FIG. 1 is a schematic diagram illustrating one embodiment of a system 101 for performing and facilitating the redemption and exchange of unused tickets in accordance with the invention. (It will be understood that FIG. 1 may be understood as representing either a system or an apparatus. For ease of discussion, the terms "system" and "apparatus" may be used interchangeably herein.)

As shown in FIG. 1, system 101, for serving customer 107, includes Quick Exchange graphical user interface (GUI) 102, Centralized Repository of Unused Tickets 103, Point of Sale (POS) Tool 104, GDS Interface Tool 105 (in this embodiment, a utility program called Runway), and pricing tool 106 (in this embodiment, Worldspan's Rapid Reprice). The term "Quick Exchange" is also used herein to refer to the application program as a whole. It is understood that, as the invention is expected generally to be employed by a large organization, multiple POS tools 104, e.g. in different geographically separate branches or offices of the organization, will be included within the system.

FIG. 1 also shows several different screens or displays that may be provided by Quick Exchange GUI 102. Specifically, there are shown a screen for displaying client (e.g. passenger/customer) identification information and the client's unused tickets, a screen for displaying a response received from Rapid Reprice and for entering a decision to accept or decline the terms outlined in the response, a screen for displaying the details of travel documents, e.g., unused tickets or new tickets, and a screen for manually entering unused tickets into Central Repository of Unused Tickets 103. Quick Exchange GUI 102 could be arranged to display these screens simultaneously as separate displays or to display only one or more screens at a time, or to be capable of doing both. Of course, it is not necessary to provide physically or functionally separate screens to display this information, and other screens or displays could also be provided. The display arrangements illustrated in FIG. 1 and described here could be further modified as will be understood by one of skill in the art. The contents of the displayed information mentioned above will be described in more detail in the discussion of the method of the present invention set forth below.

Quick Exchange GUI 102 may be deemed the central element of the system and preferably is able to communicate with all other elements. Runway (serving as GDS Interface Tool 105 in this embodiment) is a product of SITA (Société Internationale de Télécommunications Aéronautiques), an IT service provider for the airline industry. Runway serves as an intermediary between Quick Exchange GUI 102, which is internal to the travel agency, and Worldspan's Rapid Reprice, an external system of Worldspan, a third party CRS. Runway receives instructions and information (regarding an unused ticket to be redeemed and a new ticket to be purchased) from Quick Exchange and transmits it in appropriate format to Rapid Reprice. Rapid Reprice calculates the residual value of the unused ticket, applies that value to the new ticket desired to be purchased, and calculates a price for the exchange, i.e., calculates a revised price for the new ticket, which price will be valid on the condition that the old ticket is exchanged for the new ticket. Rapid Reprice transmits a response including an indication of the residual value and the revised price, and related information, to Runway, and Runway in turn sends this response to Quick Exchange. While Runway and Rapid Reprice represent elements of the invention in a preferred embodiment, one of skill in the art will of course understand that they may be replaced by other elements capable of performing equivalent functions or of providing such services. In particular, since, as discussed above, there exist multiple central reservation systems (CRSs), each of which services different airlines, it is understood that a system equivalent to or otherwise able to perform sufficiently similar functions as Rapid Reprice provided by, e.g., another CRS could be employed in the invention in place of Rapid Reprice. Likewise, a utility program equivalent to or otherwise able to perform sufficiently similar functions as Runway provided by, e.g., another travel industry service provider could be used in place of Runway.

It is noted that the Centralized Repository of Unused Tickets is the subject of another U.S. patent application, entitled "SYSTEM AND METHOD FOR CENTRALIZING AND PROCESSING TICKET EXCHANGE INFORMATION" and filed on the same date as the instant application, the contents of which application are hereby incorporated herein by reference. Since the Centralized Repository of Unused Tickets is described in detail in that application, only a brief description thereof is provided in the instant application.

It is also noted that other aspects of the present invention and related inventions have been described in U.S. patent application Ser. No. 10/708,112 (published as U.S. Patent Application Publication No. 2004/0138930 A1), U.S. patent application Ser. No. 10/294,930 (published as U.S. Patent Application Publication No. 2004/0010427 A1), U.S. patent application Ser. No. 09/346,085, and U.S. Provisional Patent Application No. 60/396,224, now expired, all of which are hereby incorporated herein by reference.

Figure 2:
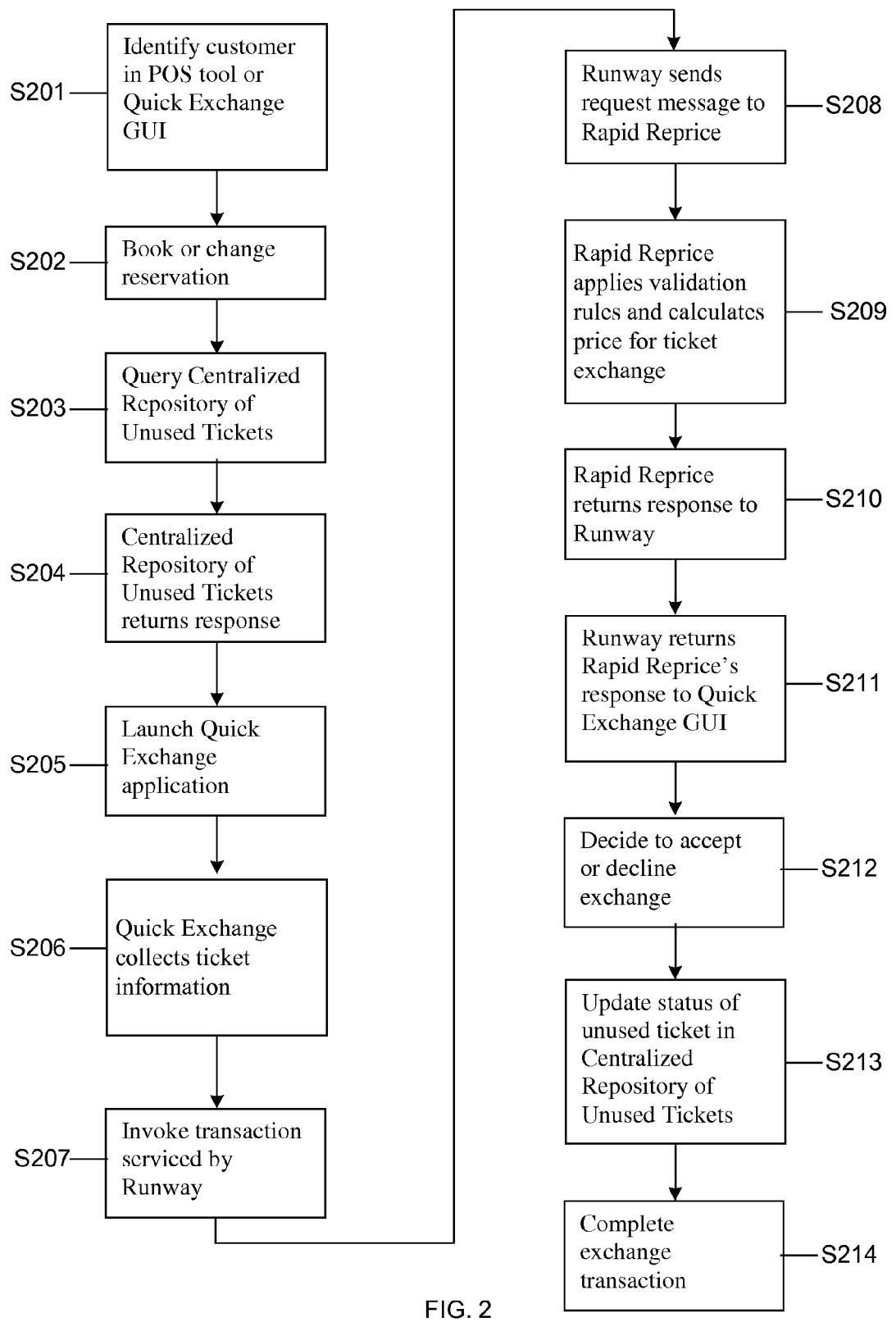
FIG. 2 is a flow chart illustrating a method of performing and facilitating the redemption/exchange of unused tickets, which method may be carried out by the system of FIG. 1.

FIG. 2 is a flow chart illustrating one embodiment of a method 201 for performing and facilitating the redemption and exchange of unused tickets in accordance with the present invention. The method may be performed by the system of FIG. 1.

The method is initiated when customer 107 contacts, e.g., a travel agency, to purchase a new air ticket. The contact between customer 107 and the travel agency may be in person, over the phone, etc. The invention is also applicable to a case in which customer 107 contacts an on-line travel agent or service (such as Travelocity, Orbitz, etc.). At step S201, customer 107 is identified in one of the agency's multiple POS tools 104 or Quick Exchange GUI 102. At step S202, a travel agent of the agency or, e.g., customer 107 in the case of an on-line transaction, books a new reservation or changes an existing reservation for a flight desired by customer 107 using POS tool 104 or Quick Exchange GUI 102.

At step S203, POS tool 104 or Quick Exchange GUI 102 queries Centralized Repository of Unused Tickets 103 to determine if customer 107 has any unused and unredeemed tickets, which could be redeemed for credit against the purchase of a new ticket. At step S204, Centralized Repository of Unused Tickets 103 returns a response, which is displayed on POS tool 104 or Quick Exchange GUI 102.

It is noted that the travel agency may assign every passenger a unique ID number. Thus, once customer 107 is identified to the travel agency, the agency is able to access pertinent information about customer 107 in its databases, including information regarding tickets previously purchased by the customer and, for any given ticket, information about the flight, cost, etc. Among other information held by the travel agency in its databases there is, for each ticket issued, a number identifying that ticket and an indication of which GDS holds the ticket information.

When a passenger cancels a ticket, or when a ticket's scheduled departure date passes and the passenger has not traveled as scheduled, the ticket information of the unused ticket may be manually or automatically (or some combination thereof) entered into Centralized Repository of Unused Tickets 103. If the ticket is a paper ticket rather than an electronic ticket, the ticket information may have to be entered manually. Based on the ticket number and knowledge of the particular GDS in which the ticket information is kept, a robotic job retrieves the passenger name record (PNR) (or other ticket record) corresponding to the ticket from the particular GDS. The robotic job parses the PNR and stores the ticket information of the unused ticket in Centralized Repository of Unused Tickets 103. The PNR includes, e.g., face value of the ticket, the date of issue, whether the ticket is fully or partly open (i.e., not used at all or having some segments used), and other flight information. The ticket information may be sent to an external system such as Global Ticket Trax/TTNR (described in at least some of the patent applications that are noted above and incorporated herein by reference) to calculate a residual value of the ticket, which may then also be stored in Centralized Repository of Unused Tickets 103. (Because the actual residual value of an unused ticket depends on many factors, as reflected in the validation rules, and this value may vary depending on which particular new ticket the unused ticket is to be exchanged for, it is understood that the residual value obtained at this juncture may be deemed tentative in this sense.) Thus, Centralized Repository of Unused Tickets 103 is able to supply the necessary information regarding unused tickets held by a given customer 107 to POS tool 104 or Quick Exchange GUI 102 upon being queried about that customer 107. Of course, unused ticket information may be made to be accessible by any of various identifiers, e.g., passenger name, client identification number, account number, etc. in addition to the above-mentioned passenger ID number. As noted, Centralized Repository of Unused Tickets 103 is discussed in greater detail in the above-noted U.S. patent application directed thereto.

If the response from Centralized Repository of Unused Tickets 103 indicates that an unused ticket purchased by customer 107 exists, and customer 107 wishes to use it for credit in exchange for a new ticket, at step S205 POS tool 104 or Quick Exchange GUI 102 launches the Quick Exchange application. At step S206, the Quick Exchange application collects the necessary information regarding the unused ticket and the new ticket. The information regarding the unused ticket is obtained from Centralized Repository of Unused Tickets 103, as discussed above, and the information regarding the new ticket is obtained from the GDS and/or from the travel agency's databases.

At step S207 the travel agent (or Quick Exchange automatically) invokes a transaction serviced by a utility (GDS Interface Tool) such as Runway. For example, the agent may send an instruction to Runway to perform a transaction. At step S208, Runway sends a request message, including any necessary information regarding the unused ticket to be exchanged and the new ticket to be purchased, to Rapid Reprice to interpret/process the validation rules. Alternatively, Rapid Reprice or some other program can perform the validation earlier and store the information in the Centralized Repository of Unused Tickets 103. Runway is able to individually tailor a request as necessary to comply with the requirements of whichever of the several GDSs to which it is sending the request. For example, each GDS may have a specific required format or commands. By using Runway, the travel agent need not know the specific format and commands for any GDS, thus easing the travel agent's duties.

At step S209, Rapid Reprice calculates a revised price for the new ticket that is valid on condition that customer 107 redeem his or her unused ticket and use its value as credit toward the purchase of the new ticket. Rapid Reprice also applies the validation rules to ensure that the unused ticket may be used as requested. Rapid Reprice guarantees that the revised price it calculates is correct. Accordingly, in the event the revised price turns out to be incorrect and the ticket issuer issues a debit memo to the travel agency, the travel agency does not lose the money (difference in price between the correct revised price and the actual price paid, if the former is higher, and penalty) that would normally be lost in such a situation.

At step S210, Rapid Reprice returns a response (indicating the revised ticket price and other pertinent information) to Runway. At step S211, Runway returns Rapid Reprice's response to Quick Exchange GUI 102. At step S212, the travel agent and customer 107 decide whether to accept or decline the exchange, i.e., the purchase of the new ticket at the revised price in exchange for the unused ticket.

The system may be arranged so that if the response from Rapid Reprice indicates that the unused ticket is not redeemable for this particular exchange, the response also indicates the reason for this. For example, the response may indicate which particular validation rule was not satisfied, on account of which the unused ticket could not be used for the particular exchange desired. In such case, based on the reason indicated in the response, the travel agent may be able to suggest to customer 107 alternative new ticket purchases, for which the unused ticket could be redeemed. For example, the changing of air carrier or flight date could render the unused ticket redeemable and could constitute a change that customer 107 is willing to make for the sake of obtaining some residual value from the unused ticket.

In addition, the system may be arranged so that if the response indicates that the unused ticket is redeemable for this particular exchange, the response also indicates the reasons on which the determination of the price of this particular exchange is based. Based on knowledge of these reasons, the travel agent may be able to suggest alternatives to the requested exchange that are more preferable in terms of price, i.e., that permit customer 107 to obtain a greater residual value from the unused ticket. For example, making a minor change to the new ticket, such as a change in air carrier or flight date, may be acceptable to customer 107 and constitute an exchange transaction that costs customer 107 significantly less money. Thus, customer 107 could decide to decline a particular exchange transaction (particular new ticket) in favor of an alternative one.

Thus, the redeemability of an unused ticket and the residual value of an unused ticket are not necessarily fixed quantities. Rather, they will generally vary depending on the conditions under which the unused ticket is to be exchanged for a new ticket. Those conditions include both the terms of the new ticket (e.g., air carrier, flight date, etc.) and terms independent of the new ticket. The conditions independent of the new ticket may be terms of the unused ticket or, e.g., terms of the airline or issuing agency that apply to all tickets it issues. The term "conditions" used here is effectively another name for the validation rules described above.

An example of a general validation rule or condition, i.e., one that is independent of the particular unused or new ticket, is a rule whereby a universal redemption penalty is automatically applied to any redemption/exchange of an unused ticket. Such general rules are commonly imposed by airlines and other ticket issuing agencies. The cost of such a penalty, assuming that the penalty applies, will be reflected in the price for the exchange (i.e., the revised price for the new ticket) calculated by Rapid Reprice. It is noted that it is of course possible for the residual value of the unused ticket to exceed the combined cost of the new ticket and the penalty, in which case the cost of the exchange transaction would be negative, i.e., customer 107 could make the transaction and obtain a credit or refund.

At step S213, the travel agent (or Quick Exchange automatically) sends a message to Centralized Repository of Unused Tickets 103 to update the status of the unused ticket, e.g., as "exchanged" (if exchanged) or "attempted to be exchanged" (if not exchanged). At step S214, Quick Exchange GUI 102 completes the exchange transaction or, if necessary, transmits the response from Rapid Reprice to POS tool 104 in order to complete the exchange transaction at POS tool 104.

One of skill in the art will understand that for some of the above steps, the order of performance need not match the listed numerical order, e.g. step S213 could be performed after step S214.

While the invention has been described above with reference to particular practices presently in use by the airline industry, those of skill in the art will recognize that the airline industry periodically changes its practices, procedures, and requirements, and the invention is not to be taken as being limited to any one particular set of airline requirements.

Example Implementations

The present invention, or any part(s) or function(s) thereof, may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
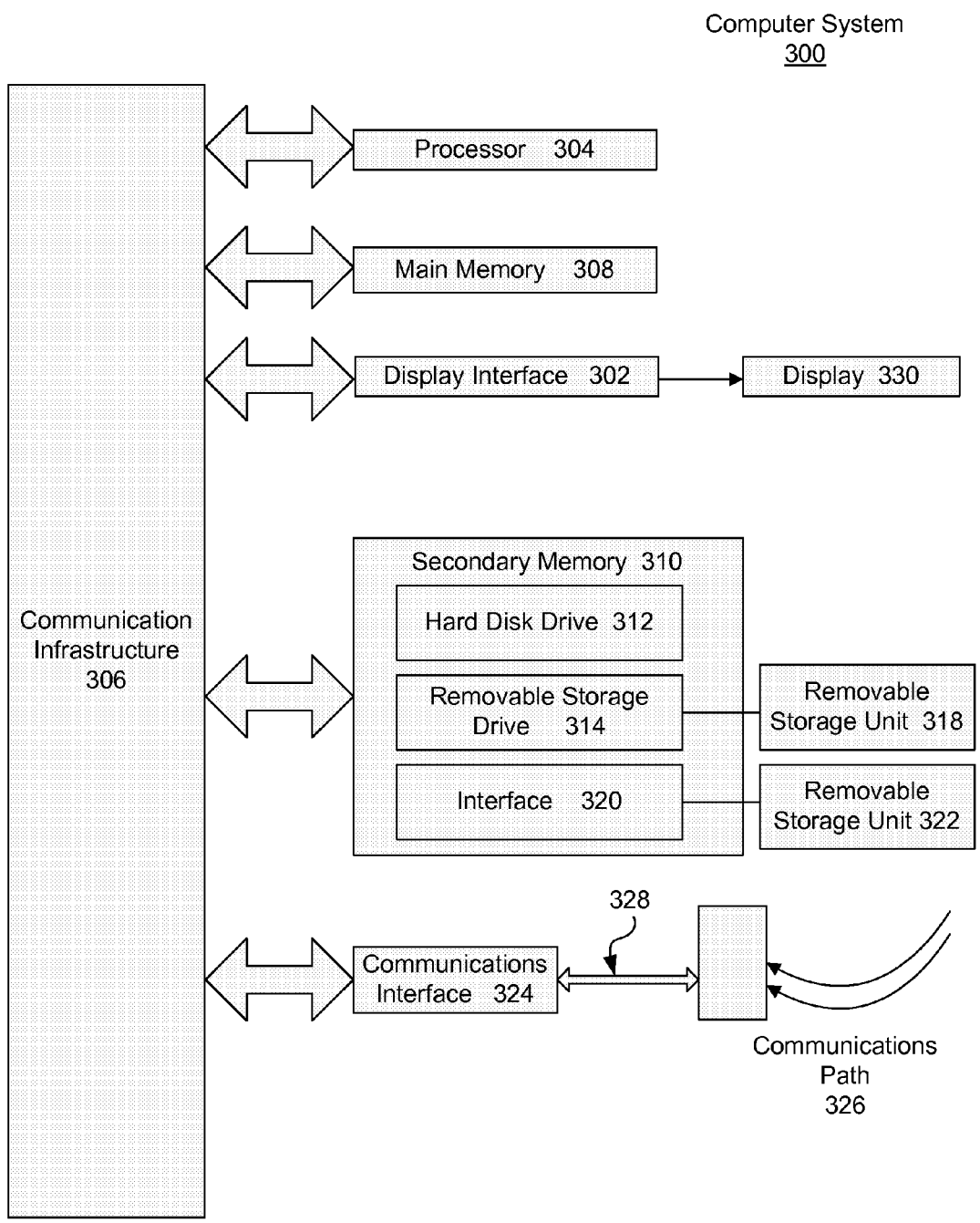
FIG. 3 is a schematic diagram of an exemplary computer system useful for implementing the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant arts how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs).

Implementation of the hardware state machine so as to perform the functions described herein will be apparent to persons skilled in the relevant arts.

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures appended hereto, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method comprising:
    receiving, by a computer based system for exchanging unused tickets, a booking for a new ticket;
    obtaining, by the computer based system, new ticket information from a passenger name record (PNR) associated with the new ticket, wherein the PNR is in a global distribution system (GDS);
    querying, by the computer based system, a centralized repository of unused tickets;
    retrieving, by the computer-based system, unused ticket PNRs from a plurality of GDS queues, wherein the retrieving is based on specific formats and commands of a particular GDS and a ticket number associated with the unused ticket;
    parsing, by the computer-based system, PNR remarks from the unused ticket PNRs to obtain ticket information related to the unused tickets;
    standardizing, by the computer based system, the PNR remarks to create standardized PNR remarks;
    receiving, by the computer based system, new price information for the new ticket, wherein the new price information is based upon the new ticket, validation rules using the standardized PNR remarks and a value of at least a portion of the unused tickets that can be applied to the price of the new ticket;
    updating, by the computer based system, a status of the unused ticket PNRs to indicate that the unused tickets have been used;
    adding, by the computer based system, the new price information to the PNR for the new ticket; and
    enabling, by the computer based system, the new ticket to be purchased based upon the new price information.

2. The method of claim 1, wherein the booking includes at least one of a new booking and a reservation change.

3. The method of claim 1, wherein the new price information includes at least one of value from the old ticket to be applied to the new ticket price and restrictions for the new ticket.

4. The method of claim 1, further comprising:
    transmitting, by the computer based system, the new price information for the new ticket for consideration; and
    receiving, by the computer based system, approval of the new price information for the new ticket.

5. The method of claim 1, wherein the PNR includes at least one of face value of the unused ticket, date of issue of the unused ticket, whether the unused ticket is fully open, whether the unused ticket is partially open, and flight information associated with the unused ticket.

6. The method of claim 1, wherein the enabling is restricted to redemption of the unused ticket, use of the value of the unused ticket as credit toward the purchase of the new ticket.

7. The method of claim 1, further comprising providing, by the computer based system, an indication that the unused ticket is not redeemable towards the value of the new ticket.

8. The method of claim 1, further comprising providing, by the computer based system, a reason that the unused ticket is not redeemable towards the value of the new ticket.

9. The method of claim 1, further comprising providing an alternative new ticket purchase for which the unused ticket is redeemable.

10. The method of claim 1, further comprising providing, by the computer based system, an explanation of the value of at least a portion of the unused tickets that can be applied to the price of the new ticket.

11. The method of claim 1, further comprising providing suggestions for optimizing the new price information.

12. The method of claim 1, further comprising providing, by the computer based system, suggestions for increasing the value of at least a portion of the unused tickets that can be applied to the price of the new ticket.

13. The method of claim 1, further comprising receiving, by the computer based system, a decline of the new price information.

14. The method of claim 1, further comprising adjusting, by the computer based system, the new price information based on adjustments to the new ticket.

15. The method of claim 1, further comprising adjusting, by the computer based system, the new price information based on adjustments to the value of at least a portion of the unused tickets.

16. The method of claim 1, further comprising adjusting, by the computer based system, the new price information based on adjustments to the validation rules.

17. The method of claim 1, wherein the validation rules are based on at least one of airline terms and issuing agency terms.

18. The method of claim 1, wherein the validation rules include a redemption penalty applied to the price of the new ticket.

19. The method of claim 1, further comprising providing a credit in response to the value of the unused tickets being greater than an original price for the new ticket.

20. The method of claim 1, further comprising updating the status of the unused tickets.

21. The method of claim 1, wherein the standardizing further comprises:

determining where the GDS places the PNR remark in the PNR, wherein different GDSs place the same type of data in a different location of the PNR, and wherein different PNRs are obtained from different GDSs; and determining where to add the PNR remark to a database, such that similar PNR remarks are in the same location in the database.

22. An article of manufacture including a non-transitory, tangible computer readable medium having instructions stored thereon that, in response to execution by a computer-based system for exchanging unused tickets, cause the computer-based system to perform operations comprising:

receiving, by the computer based system, a booking for a new ticket;

obtaining, by the computer based system, new ticket information from a passenger name record (PNR) associated with the new ticket, wherein the PNR is in a global distribution system (GDS);

querying, by the computer based system, a centralized repository of unused tickets;

retrieving, by the computer-based system, unused ticket PNRs from a plurality of GDS queues, wherein the retrieving is based on specific formats and commands of a particular GDS and a ticket number associated with the unused ticket;

parsing, by the computer-based system, PNR remarks from the unused ticket PNRs to obtain ticket information related to the unused tickets;

standardizing, by the computer based system, the PNR remarks to create standardized PNR remarks;

receiving, by the computer based system, new price information for the new ticket, wherein the new price information is based upon the new ticket, validation rules using the standardized PNR remarks and a value of at least a portion of the unused tickets that can be applied to the price of the new ticket;

updating, by the computer based system, a status of the unused ticket PNRs to indicate that the unused tickets have been used;

adding, by the computer based system, the new price information to the PNR for the new ticket; and enabling, by the computer based system, the new ticket to be purchased based upon the new price information.

23. A system comprising:

a processor for exchanging unused tickets, a tangible, non-transitory memory configured to communicate with the processor, the tangible, non-transitory memory having instructions stored thereon that, in response to execution by the processor, cause the processor to perform operations comprising:

receiving, by the processor, a booking for a new ticket;

obtaining, by the processor, new ticket information from a passenger name record (PNR) associated with the new ticket, wherein the PNR is in a global distribution system (GDS);

querying, by the processor, a centralized repository of unused tickets;

retrieving, by the processor, unused ticket PNRs from a plurality of GDS queues, wherein the retrieving is based on specific formats and commands of a particular GDS and a ticket number associated with the unused ticket;

parsing, by the processor, PNR remarks from the unused ticket PNRs to obtain ticket information related to the unused tickets;

standardizing, by the processor, the PNR remarks to create standardized PNR remarks;

receiving, by the processor, new price information for the new ticket, wherein the new price information is based upon the new ticket, validation rules using the standardized PNR remarks and a value of at least a portion of the unused tickets that can be applied to the price of the new ticket;

updating, by the processor, a status of the unused ticket PNRs to indicate that the unused tickets have been used;

adding, by the processor, the new price information to the PNR for the new ticket; and enabling, by the processor, the new ticket to be purchased based upon the new price information.

* * * * *